United States Patent [19]

Lafferty

[11] Patent Number: 4,619,467
[45] Date of Patent: Oct. 28, 1986

[54] VARIABLE RATE AIR SPRING APPARATUS FOR VEHICLE SUSPENSION

[76] Inventor: James W. Lafferty, 11122 Wright Rd., Lynwood, Calif. 90262

[21] Appl. No.: 600,949

[22] Filed: Apr. 16, 1984

[51] Int. Cl.$^4$ .............................................. B60G 11/26
[52] U.S. Cl. ..................................... 280/708; 280/680; 280/686; 280/710; 280/712; 280/DIG. 1
[58] Field of Search ............... 280/708, 709, 710, 711, 280/712, DIG. 1, 686, 104, 678, 680, 683

[56] References Cited

U.S. PATENT DOCUMENTS

| | | | |
|---|---|---|---|
| 1,831,098 | 11/1931 | Davis | 280/710 |
| 1,861,821 | 6/1932 | Schaum | 267/2 |
| 1,987,269 | 1/1935 | Roos | 280/710 |
| 2,181,161 | 11/1939 | Wolf | 188/10 |
| 2,184,202 | 12/1939 | Tschanz | 280/710 |
| 2,323,204 | 6/1943 | Cross | 267/20 A |
| 2,828,138 | 3/1958 | Brueder | 280/710 |
| 2,848,249 | 8/1958 | Bertsch et al. | 280/711 |
| 2,861,794 | 11/1958 | Beck | 267/2 |
| 2,934,356 | 4/1960 | Killinger | 280/711 |
| 3,063,732 | 11/1962 | Harbers et al. | 280/712 |
| 3,094,341 | 6/1963 | Alfieri | 280/712 |
| 3,233,915 | 2/1966 | Hamlet | 280/712 |
| 3,704,895 | 12/1972 | Remaud | 280/709 |
| 3,738,680 | 6/1973 | Pollinger et al. | 280/711 |
| 3,784,221 | 1/1974 | Frasier, Sr. | 280/712 |
| 3,784,228 | 1/1974 | Hoffmann et al. | 280/6 H |
| 3,920,264 | 11/1975 | Lafferty | 280/718 |
| 4,061,320 | 12/1977 | Warner | 280/708 |
| 4,325,541 | 4/1982 | Korosladanyi et al. | 267/8 R |

FOREIGN PATENT DOCUMENTS

| | | | |
|---|---|---|---|
| 1119322 | 6/1956 | France | 280/DIG. 1 |
| 1149936 | 1/1958 | France | 280/DIG. 1 |

Primary Examiner—John J. Love
Assistant Examiner—Kenneth R. Rice
Attorney, Agent, or Firm—Fulwider, Patton, Rieber, Lee & Utecht

[57] ABSTRACT

An air spring apparatus for a vehicle suspension. An active air cylinder and piston of the apparatus are connected in series with the vehicle suspension. An inactive air cylinder constituting an air column extension of the active air cylinder is connected in series with the active air cylinder by an air conduit. The spring rate of the system is automatically adjustable to produce optimum isolation of impulsive forces and to maintain the forces on the road under dynamic conditions essentially equal to those forces under static conditions.

11 Claims, 2 Drawing Figures

VARIABLE RATE AIR SPRING APPARATUS FOR VEHICLE SUSPENSION

BACKGROUND OF THE INVENTION
1. Field of the Invention

The present invention relates to an air spring apparatus for a vehicle suspension, and more particularly to such an apparatus in which the spring rate of the air spring is variable according to the dynamic conditions encountered.

2. Description of the Prior Art

In vehicles such as large trucks, a properly designed suspension will maintain a relatively constant distance between the axle and vehicle frame under all conditions of speed, load and road profile, and it will also act as a vibration isolator or dynamic dampener to absorb road shocks. Ideally, actual applied loads transferred to the road through the wheel should not exceed ten percent of the gross axle load in a static condition, that is, with the vehicle standing still. When loads exceed this limit there is a potential for damage to the road and to the vehicle, which becomes a reality at high levels of load, vehicle speed, and road irregularity. Despite various attempts to maintain applied loads to an acceptable level, the nation's highways have suffered severe and continuing damage, and many believe a large part of the blame for this is the inability of planners to recognize that improper vehicle suspensions are the major controllable culprit.

Typically, a truck suspension takes the form of a bridge beam, as in a leaf spring suspension, or a cantilevered beam, as in an air bag suspension. No matter what its form, the shock isolator or dampener operates like a spring, ideally with a very low spring constant. However, this ideal cannot be met because there is a constricted space adjacent the wheel, and between the wheel and the frame, and such a low spring rate spring would not fit into the available space. Further, a high rate spring is needed to maintain the desired frame height above the axle under maximum load conditions.

The load may vary, for example, between 2,000 to 20,000 pounds per axle, more than half the time falling within the range of 3,000 to 8,000 pounds. Provision must be made for some overloading, even though perhaps not authorized by the carrier, and also for dynamic overloading.

Assuming the shock isolator is a leaf spring, which is common in the prior art, effective shock isolation is only possible at or very close to maximum allowable load. The spring constant, which is necessarily high to support the maximum load, does not change for other loads. Under partial or no load conditions, the high spring rate of the leaf spring does not permit the spring to be significantly deflected, and there is inadequate absorption of the energy resulting from wheel impact against road obstructions. Consequently, at partial loads the lead spring acts essentially like a solid member, and all road shocks are passed without attenuation to the sprung mass of the vehicle. This essentially direct transmission of road shocks may take place at the natural frequency of the sprung mass, in which case the resultant oscillation of the vehicle and suspension system can render handling of the vehicle difficult, and subject both the vehicle and the road bed to constant pounding.

It is possible to modify the unsatisfactory results flowing from a high spring rate suspension by supplementing the leaf spring beam with a secondary spring in series with the leaf spring beam. However, this is effective only at no-load, and poor shock isolation then exists between the no-load and maximum load conditions.

In my U.S. Pat. No. 3,920,264, issued Nov. 18, 1975 for "Vehicle Low-Load Isolator Spring Suspension Apparatus", an isolator spring means serves as an auxiliary spring for interposition between the usual leaf spring and the sprung mass of the vehicle to handle suspension under no or low-load conditions. The auxiliary spring completely deflects or bottoms out under heavy load conditions whereby the leaf spring then assumes the vibration energy absorption function. In effect, the auxiliary spring acts as a "soft" spring located between the "hard" leaf spring, which is mounted between the frame and the wheels, axles and associated parts constituting the unsprung mass. Such an auxiliary spring system works reasonably well, but insufficient room exists adjacent the wheel and leaf spring suspension area to accommodate the size of auxiliary spring system capable of handling more than a narrow range of loads. Moreover, to be completely adaptable to the many different truck and suspension designs, a proper apparatus of this type would require auxiliary coil springs of different spring rates, which is a practical impossibility.

Various other means have been tried to provide adequate vibration isolation, but without particular success. For example, pneumatic or air bags have been used in combination with conventional shock absorber cylinders. Such bags are located between the vehicle frame and axle, with the axle held in position by a cantilevered beam pivoted at the frame. Air is pumped into each bag from the truck supply until the axle is located at the desired level relative to the frame.

The material of which the bag is made is elastic. When it is placed under a load, the air in the bag is compressed and the bag distends at a rate proportional to the elasticity of the bag. The air bag does not act as a true air spring in that it is not responsive to Boyles gas laws, that is, its volume does not change in direct proportion to pressure changes. Consequently, although the spring rate varies somewhat over its range of operation, it is essentially constant regardless of the load being supported. It is influenced primarily by the elasticity of the material of which the bag is made, that is, such elasticity largely determines the spring rate.

Inasmuch as the spring rate of such an air bag is a constant, it is therefore no more capable of accommodating a range of loads than was the auxiliary or secondary coil spring arrangement.

On inflation of such an air bag, the surfaces between which it is disposed are separated a predetermined amount at some predetermined internal air pressure. When the vehicle load increases, the surfaces tend to move together, increasing the forces on the bag and the bag expanding it a distance directly proportional to the elasticity of the material.

Typically, the spring rate or elasticity of the air bag material is selected such that it is low enough to operate effectively as a shock isolator for the usual frequencies developed by the wheel/road profile contact. This low rate is productive of a natural frequency in the same range as the frequencies transmitted to each bag by the associated vehicle wheel. Consequently, order to avoid resonance and destruction of the bag it is essential that the bag operate in parallel with a secondary, two way damping mechanism such as a double acting shock absorber.

Air bag systems not only suffer from the fact that such secondary shock absorbers must be used in conjunction with the air bags, but air bags are also relatively costly to purchase and maintain. Further, they are heavy and bulky, too bulky to be used in conjunction with vehicle steering axles. In addition, an air bag system can only be used with a cantilevered beam, and over three-quarters of the heavy duty trucks on the roads today use some form of spring beam such as a leaf spring.

What is needed is a road shock or vibration isolator of compact form, adapted to fit in the constricted space available, and capable of automatically adjusting its spring rate to provide optimum isolation of impulsive forces at any point of load within its design limits.

SUMMARY OF THE INVENTION

According to the present invention, a variable rate air spring apparatus is provided which is adapted to be coupled to the usual vehicle suspension means, such as to a leaf spring beam, in the constricted space available adjacent the vehicle frame and axle. Its characteristic variable spring rate enables the apparatus to be used on many different truck and suspension designs.

Essentially the apparatus comprises an inexpansible air cylinder means, compared to the flexible air bag of the prior art. The rigid air cylinder means defines an air chamber having an air piston reciprocable within it on opposite sides of a neutral position corresponding to the static position of the vehicle frame. The air cylinder and piston are coupled in series with the vehicle suspension and the frame in such a way that the air piston reciprocates in response to movement of the axle.

There are two versions of the present invention, one for shock isolation for vehicles in an essentially unladen condition, and one for shock isolation through the full range of vehicle loading, that is, from unladen to fully laden. In one version the air so called active cylinder and piston are located adjacent the wheel and axle. The constricted space limits the size of the air cylinder so that, as will be seen, it can provide shock isolation essentially only at a no-load condition, much like the coil or auxiliary spring of my U.S. Pat. No. 3,920,264. The other version locates the active air cylinder remotely of the wheel and axle so that it is made of a size adequate to provide shock isolation from no-load through the full range of loading to fully loaded. In both versions the active air cylinder and piston means are disposed in-series with the vehicle suspension and a mechanical multiplier means which in the usual case is respectively, a leaf spring and a lever.

In either version, the required active air cylinder height is reduced by employing a remotely located inactive air cylinder which is sized to act as an air column extension of the active air cylinder and provides the volume necessary to ensure that the spring rate will be extremely low, and that the natural frequency will be capable of absorbing impulsive forces which might be as low as 4 to 20 cycles per second.

The communication between the inactive air cylinder and the active air cylinder is sufficiently friction free that the air pressures in both are essentially the same.

The apparatus further includes a source of air, usually the vehicle air compressor, for pressurizing the air cylinder to locate the air piston in its neutral position. This position corresponds to the static position of the axles and suspension means relative to the frame, that is, the approximate midpoint of the excursions followed by the axles and suspension means in passing over the road profile.

A height control means maintains a predetermined flow of air into the air cylinders, tending to locate the air piston in its neutral position.

The inexpansible active air cylinder constitutes an air spring having a non-linear spring rate, in contrast to the constant spring rate, linear force-displacement property of coil or leaf springs.

In one embodiment of the invention the active air cylinder means is directly interposed through the mechanical multiplier means between the suspension system and the vehicle frame. In another embodiment a fluid slave cylinder is located in this position, the fluid slave pistons being coupled in-series to a master fluid cylinder whose piston actuates the active air cylinder remotely located and coupled to the remotely located air cylinder.

No secondary damping or double acting shock absorber is required in association with the present apparatus inasmuch as the apparatus characteristically does not have a constant natural frequency and consequently cannot resonate under the influence of impulsive forces transmitted by the vehicle wheels as they encounter road obstructions.

Other objects and features of the invention will become apparent from consideration of the following description taken in connection with the accompanying drawings.

DESCRIPTION OF THE PREFERRED EMBODIMENT

Figure 2:
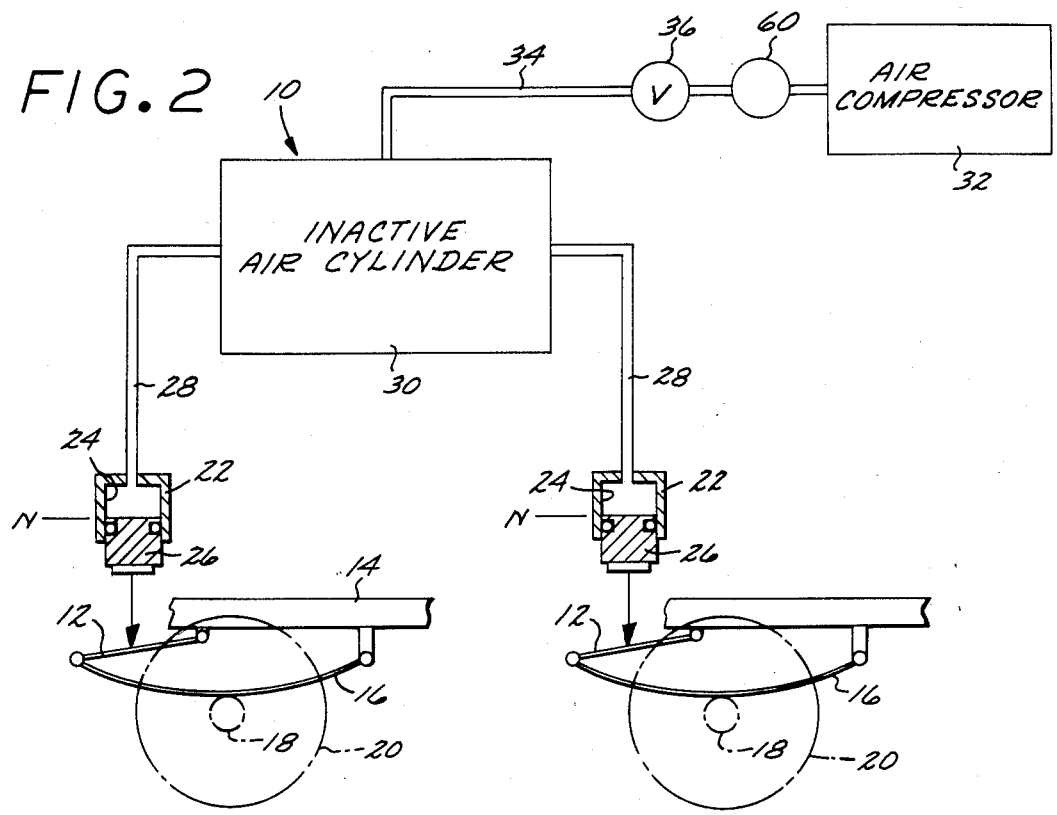
FIG. 2 is a diagrammatic view of a second embodiment of the present invention, similarly illustrated in association with a diagrammatically indicated vehicle frame, wheel and suspension system.

Referring now to the drawings, and particularly to FIG. 2, the variable rate air spring apparatus is generally indicated at 10. As will be seen, this embodiment provides shock isolation essentially only at a no-load condition. The apparatus 10 is illustrated in series association with a vehicle suspension system diagrammatically indicated as including a mechanical multiplier in the form of an elongated lever or beam 12 pivoted at one extremity to the vehicle frame 14, and further including a leaf spring 16 coupled in-series to the opposite extremity of the beam 12. The other extremity of the leaf spring 16 is pivoted to the frame 14. The axle 18 of the vehicle wheel 20 effectively acts against the midportion of the leaf spring 16 to transmit road shocks of the unsprung mass, comprising elements 12, 18 and 20, to the sprung mass, which comprises the frame 14. Details respecting the interconnection of the sprung and unsprung masses are omitted inasmuch as such details are well known to those skilled in the art and they do not form a part of the present invention U.S. Pat. No. 3,920,264, issued Nov. 18, 1975, to James W. Lafferty, is instructive in this regard. Moreover, although the apparatus 10 is illustrated in association with a suspension characterized by a leaf spring 16, the apparatus 10 is equally adapted for series association with any element of any vehicle suspension which is movable in response to movements of the vehicle wheels over the road profile.

An important consideration in the design of a suspension system for minimizing transmission of wheel impacts to the frame 14 is control of the natural or operating frequency developed by the apparatus 10. As will be seen, this frequency is constant in the aparatus 10. In general, it has been found desirable to make the natural frequency of the apparatus 10 a small value, in the order of one and one-half cycles per second. To keep the frequency at this rate, and assuming the suspended weight of the vehicle will vary because of changes in the loads being carried, the spring rate of the apparatus 10 must be variable.

As seen in FIG. 2, the apparatus 10 includes an inexpansible air cylinder means in the form of rigid cylinders 22 defining active air chambers 24, and having air pistons 26 reciprocable therein from one side to the other of a neutral position designated by the letter "N". The piston rod of the piston 26 is coupled in any suitable fashion to the beam 12 for reciprocating the piston 26 responsive to movement of the axle 18 and the high spring rate leaf spring 16 of the suspension system.

The chamber 24 is coupled by conduits 28 to a rigid or inflexible inactive air cylinder 30 located remote from the axle and suspension system, where there is adequate room for such a tank. The conduit 28 is made large enough so that it is sufficiently friction free that the pressures in the chamber 24 and the inactive air cylinder 30 are substantially the same during reciprocation of the air piston 26. Consequently, the inactive air cylinder 30 constitutes, in effect, an air column extension of the air chamber 24, providing the necessary volume for proper functioning of the apparatus 10 despite the confined space within which the active cylinder 22 must fit.

A source of air under pressure, such as the vehicle air compressor 32, is connected to the inactive air cylinder 30, the compressor 32 being connected by a conduit 34 to the inactive air cylinder 30 through a suitable air tank 60 and a suitable air pressure regulator 36. The regulator 36 constitutes the control for maintaining a in the inactive air cylinder 30, such that the air piston 26 is located in its neutral position "N", in the unladen or no-load condition of the vehicle. The axle and suspension means will then be in their no-load static positions relative to the frame 14. For example, in the no-load or unladen condition of the vehicle, the regulator 36 is adjusted so that the pressure developed by the compressor 32 in the inactive air cylinder 30 and chamber 24 pivots the beam 12 in a counterclockwise direction, as illustrated in FIG. 2, to raise the frame 14 to its desired static position, at which position the piston is located in its neutral position "N".

As will be evident from the showing in FIG. 2, the compressor 32, air regulator 36, inactive air cylinder 30, and active air cylinders 22 are all connected in-series with the leaf spring 16. As is well known to those skilled in the art, springs in-series add to form a system spring rate ($k_{ss}$) such that:

$$k_{ss} = k_a \left[ \frac{1}{1 + \frac{k_a}{k_1}} \right]$$

here $k_1$ is the spring rate of the typical high spring rate leaf spring 16 which is in-series with the air spring have the spring rate $k_a$.

This can be written as:

$$k_{ss} = k_a \left[ \frac{1}{1 + \frac{k_a}{k_1}} \right]$$

With $k_a$ much less than $k_1$, $k_a/k_1$ becomes approximately zero such that:

$$k_{ss} = k_a$$

As the vehicle travels over a roadway, impacts imparted to the vehicle wheel by the road profile cause movement of the piston 26 up and down on opposite sides of the neutral position resulting in momentary increases and decreases in the pressure in the chamber 24 and inactive air cylinder 30. Preferably, the regulator 36 is selected to be unresponsive to these momentary pressure differentials.

With the foregoing arrangement, since the chamber 24 is defined by the rigid cylinder 22, in contrast to a flexible bag of the prior art, the system functions as a true air spring with a constant natural frequency.

The rigid chamber 24, with its air column extension or inactive air cylinder 30, conforms to Boyles gas law equation $P_1 V_1 = P_2 V_2$. Temperature is not a factor in the operation of the present system inasmuch as the impulsive frequencies normally range between four and twenty cycles per second, which is sufficiently high that there is effectively no temperature change between cycles.

The spring rate of apparatus 10 is predeterminable for any variation in static load. It depends upon the relationship between the volume displaced by the piston and the total initial volume of the active cylinder and its associated inactive cylinder. The force required to locate the operating position of the piston under any load depends upon the area of the piston and the available air pressure. Therefore, it is possible to build a pure air spring, as will be seen in connection with the embodiment of FIG. 1, whose rate will automatically adjust to any static load condition between maximum allowable load and no load simply by automatically controlling the compressed air supply. However, in the embodiment of FIG. 2, the system rate is manually preset to remain constant at the no-load condition.

Simply by determining the effective free height of the cylinder, it is fairly simple to produce an air spring capable of dampening impulsive forces as low as 1 cycle per second or as high as 20 cycles per second.

This system can be applied to over 80 percent of the existing spring beam suspensions simply by replacing the rear spring hanger with a specially designed mechanical multiplier, lever or rear hanger of very nearly the same size and weight as the original hanger. It can be also be readily applied to the spring beam suspension used on the steering axles. It requires only one system to take care of either single-axle suspensions using two spring beams or four-spring tandem axles using four spring beams. It could also be applied to walking beam tandem axles. It does not make any difference whether the axle is driven or free rolling. The air spring is the critical item.

As previously indicated, the embodiment of FIG. 2 is intended for use to supplement the usual leaf spring under no load conditions. Typical users for such a system would be truckers which operate fully loaded approximately 50 percent of the time.

In operation of the embodiment of FIG. 2, the regulator valve 36 is manually adjusted until the air pressure in the active and inactive cylinders 22 and 30 increases to the point that the beam 12 is driven through approximately 60 percent of its available travel. At this point the pressure regulator 36 is set and air does not then pass to or from cylinders 22 and 30. Thereafter, the air spring apparatus 10 will always develop the proper pressure on the beam 12 to compensate for changes in dynamic loading. The combined volume of the active air cylinders 22 and inactive air cylinder 30 insures that the total volume of air available, as compared to the maximum displaced volume during dynamic loading, will produce ideal shock isolation.

Figure 1:
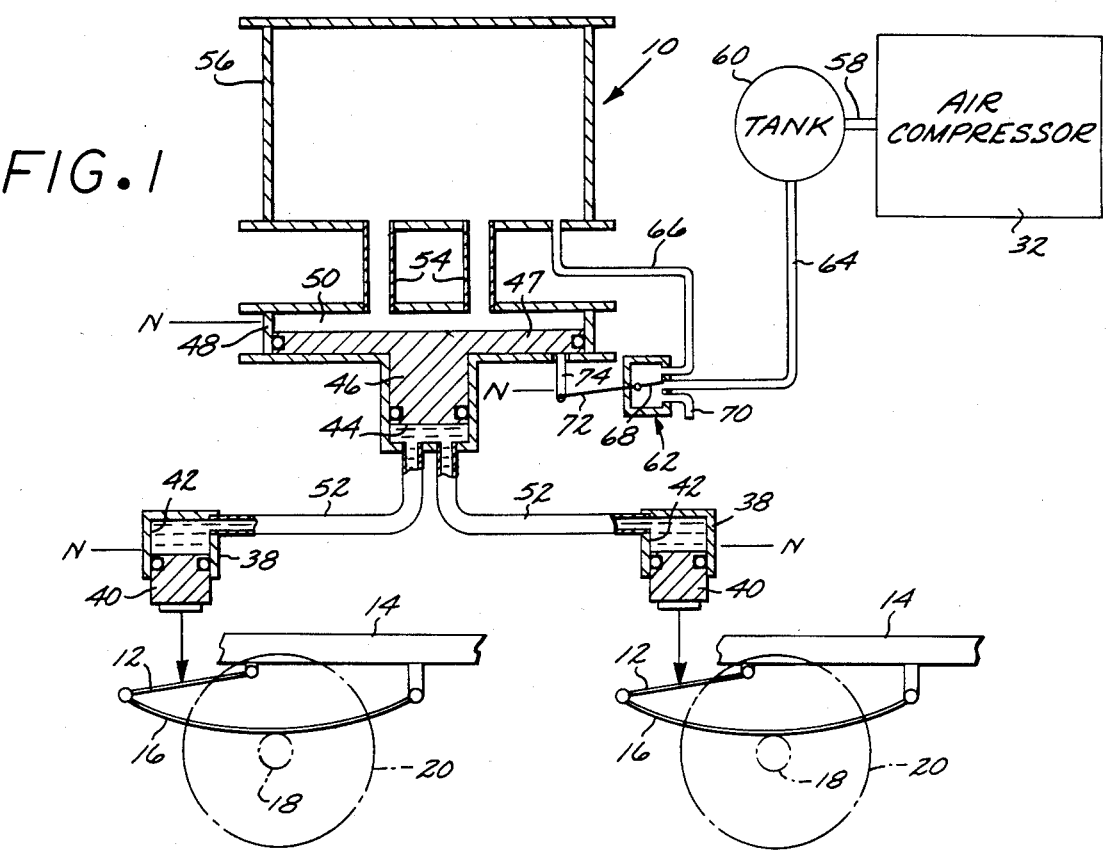
FIG. 1 is a diagrammatic view of one embodiment of the present invention, illustrated in association with a diagrammatic showing of a vehicle frame, wheel and suspension system.

The embodiment of FIG. 1 illustrates an arrangement in which a large air piston can be accommodated by locating it remote from the wheel area and coupling it in-series with the leaf springs by fluid couplings.

A pair of fluid or oil cylinders 38 are located adjacent the pair of leaf springs. The piston rod of each piston 40, which is reciprocable in the associated cylinder 38, is then suitably mechanically coupled to the adjacent beam 12. Each cylinder 38 defines a hydraulic chamber 42 which is filled with hydraulic fluid or oil. A conduit 52 provides a hydraulic coupling between each chamber 42 and the underside 44 of a hydraulic piston 46. A larger diameter air piston 47 is integral with the hydraulic piston 46, the air piston 47 corresponding to the piston 26 of the embodiment of FIG. 2.

Although the single piston 46 is illustrated in association with the two spring beams 16, it can also be employed in association with other suspension means, such as four spring tandem axles using four spring beams, or with walking beam tandem axles. The character of the element transmitting the road shocks to the fluid piston 40 is immaterial.

The fluid pistons 40 and 46 in effect provide a rigid coupling between the beams 12 and the air piston 47, much as if the air piston 47 were mechanically coupled directly to the beams 12. Thus, vertical displacement of the fluid pistons 46 and 40 is identical to the vertical displacement of the air piston 47.

The embodiment of FIG. 1 is adapted to adjust the spring rate for any static load condition between no load and the maximum allowable load. This is done simply by automatically controlling the flow of pressurized air into the air cylinder 50 within which the air piston 47 is reciprocable. There is no need for secondary shock absorbers, as in the case of the prior art air bag systems.

The air piston 47 is reciprocable within an inexpansible or rigid air cylinder means or cylinder 48 which, together with the upper surface of the piston 46, defines the active air chamber 50. As was the case with the embodiment of FIG. 2, the piston 47 is characterized by a neutral position "N" which corresponds to the static position of the axle 18 and the suspension means 16 and 12 under static loads.

The air cylinder 48 is located remote from the axle 18 and suspension means 16 and 12, the piston 47 moving in exact correspondence with movements of the pistons 40 by reason of the essentially friction free fluid connection provided by the conduits 52 extending between the hydraulic chambers 42 and the underside 44 of the hydraulic piston 46.

The active air chamber 50 is coupled by one or more conduits 54 to a remotely located rigid or inflexible inactive air cylinder 56 similar to the inactive air cylinder 30 of the embodiment of FIG. 2. The conduits 54 are made large enough so that they are sufficiently friction free to establish equal pressures in the chamber 50 and in the inactive air cylinder 56 during reciprocation of the air piston 47. The inactive air cylinder 56 constitutes an air column extension of the active air chamber 50, providing the necessary volume for proper functioning of the apparatus.

A source of air under pressure, which may be the vehicle air compressor 32, is connected by a conduit 58 to a tank 60. An automatic height control means 62 is coupled to the tank 60 by a conduit 64, and to the inactive air cylinder 56 by a conduit 66.

The control means 62 may be any suitable control available in the art operative to provide the functions which will be described. One suitable control is presently marketed as a height and leveling air control valve for air ride suspensions. This type of valve, as is well known in those skilled in the art, includes an internal valve element, diagrammatically indicated at 68, which is pivotable within the control means 62 to direct the flow of air from the conduit 64 for passage into the conduit 66, and thence to the air cylinder 56, or through a vent conduit 70 to atmosphere. In one extreme position, all of the air passes into the air cylinders 48 and 56, while in the other extreme position all of the air is vented to atmosphere through the conduit 70.

The element 68 includes a projecting portion 72 which is pivotally connected to a link 74. The link 74 is fixedly coupled to the underside of the air piston 47, but it is not important to what part of the air piston 47 the link 74 is coupled, so long as the relative position of the air piston 47 is sensed. If desired, the relative position of the air piston 47 can be indirectly sensed, as by sensing the position of one of the elements which move in common with the movement of the air piston 47, such as one of the pistons 40.

When the static loading on the vehicle is changed, the piston 47 will move from its neutral position "N". For example, if the static loading is increased, the piston 47 will be raised above its neutral position "N", and control means 62 will admit air to the inactive air cylinder 56 to drive the piston back toward its neutral position. Conversely, if the load is decreased, air will be vented to atmosphere and the piston 47 will rise toward its neutral position "N".

The control means 62 is preferably characterized by a time delay in operation whereby it does not respond to relatively rapid movements of the air piston 47 away from its neutral position "N". Thus, substantially no air is admitted to or vented from the air cylinders 48 and 56 during the rapid movements which would be produced by the road profile.

The air piston 47 thus constitutes an air spring having a very low natural frequency and operative throughout the full range of loading, from no-load to fully loaded. Consequently, the apparatus of FIG. 1 can be utilized to eliminate the usual leaf spring 16 or other like suspension, the piston rods of the fluid pistons 40 being coupled directly to the beam when the axle is carried by a cantilever beam of the like. The system is illustrated in-series association with a pair of leaf springs 16 inasmuch as this would be the configuration for fitting the system to existing trunk suspensions.

From the foregoing it can be seen that an air spring apparatus is provided which automatically adjusts its spring rate to producer optimum isolation of impulsive forces at any point of load within its design limits. The embodiment of FIG. 2 must operate in series with a spring suspension, while the embodiment of FIG. 1 can be used with or without standard spring beams.

Various modifications and changes may be made with regard to the foregoing detailed description without departing from the spirit of the invention.

I claim:

1. In a vehicle having a frame, an axle, and suspension means coupling said axle to said frame for movement of said axle and said suspension means relative to said frame through a dynamic range during travel of the vehicle over a roadway, said dynamic range including a static position relative to said frame, determined by the static load on said axle and said suspension means when the vehicle is stopped, an improved air spring apparatus comprising:

inexpansible active air cylinder means defining air chamber means and having air piston means reciprocable therein from one side to the other of a neutral position to increase and decrease the pressure in said air chamber means, said active air cylinder means and said air piston means being operatively coupled in-series with said suspension means and said frame for reciprocating said air piston means responsive to said movement of said axle and said suspension means;

inactive air cylinder means located remote from and coupled in-series with said active air cylinder means, said axle and said suspension means, and including first conduit means providing fluid communication with said air chamber means sufficiently friction free that the pressures in said air chamber means and said inactive air cylinder means are substantially the same during reciprocation of said air piston means whereby said inactive air cylinder means thereby constitutes an air column extension of said active air chamber means;

a source of air under pressure;

second conduit means providing fluid communication between said source and said inactive air cylinder means; and height control means for maintaining a predetermined location of said air piston means in said active air cylinder means, at a level operative to tend to locate said air piston means in said neutral position, and thereby tend to locate said axle and said suspension means in said static position.

2. Air spring apparatus according to claim 1 wherein said control means is of that type which is responsive to relatively prolonged location of said air piston means away from said neutral position for admitting air to or venting air from said active air cylinder means to establish said predetermined neutral position, but which is unresponsive to relatively rapid movements of said air piston means away from said neutral position whereby substantially no air is admitted to or vented from said active air cylinder means during said rapid movements.

3. Air spring apparatus according to claim 2 wherein said height control means includes a sensing element physically responsive only to the static position of said air piston means relative to said neutral position.

4. Air spring apparatus according to claim 1 wherein said height control means includes a manually selectively adjustable air regulating means located between said source of air and said active air cylinder means.

5. Air spring apparatus according to claim 1 wherein said active air cylinder means are located adjacent said axle and said suspension means.

6. Air spring apparatus according to claim 1 wherein said active air cylinder means is located remote from said axle and said suspension means, said active air cylinder means further including a master hydraulic chamber means located oppositely of said air chamber means whereby hydraulic fluid flowing into said hydraulic cylinder moves said air piston means to increase the pressure in said air chamber means, and hydraulic fluid flowing out of said hydraulic chamber means allows said air piston means to move to decrease the pressure in said air chamber means; and including a pair of slave hydraulic cylinder means coupled to said hydraulic chamber means and each having hydraulic piston means reciprocable therein said located adjacent said axle and said suspension means for reciprocation in response to movement thereof during travel of the vehicle over a roadway.

7. Air spring apparatus according to claim 6 wherein said suspension means comprises leaf spring means interposed in-series with said hydraulic piston means and said axle.

8. In a vehicle having a frame, an axle, and suspension means coupling said axle to said frame for movement of said axle and said suspension means relative to said frame through a dynamic range during travel of the vehicle over a roadway, said dynamic range including a static position determined by the static load on said axle and said suspension means when the vehicle is stopped, an improved air spring apparatus comprising:

slave hydraulic cylinder means having hydraulic piston means reciprocable therein and located adjacent to and in-series with said axle and said suspension means for reciprocation in response to movement thereof during travel of the vehicle over a roadway;

inexpansible active air cylinder means located remote from said axle and said suspension means and including an active air chamber and a master hydraulic chamber, said active air cylinder means having air piston means reciprocable in said active air chamber, and master hydraulic piston means integral with said air piston means reciprocable in said master hydraulic chamber, said master hydraulic chamber being in fluid communication with said slave hydraulic cylinder means, said fluid communication being sufficiently friction free that the movement of said master hydraulic piston means and the piston means of said slave hydraulic cylinder means are the same during rapid reciprocation of the piston means of said slave hydraulic piston means, said air piston means being reciprocable with said master hydraulic piston means for reciprocation from one side to the other of a neutral position to establish a direct series link between said active air cylinder means and said suspension means;

active air cylinder means having an inactive chamber and located remote from said axle and said suspension means, and including first conduit means providing fluid communication with said active air chamber sufficiently friction free that the pressures in said active air chamber and said inactive air chamber are the same during reciprocation of said air piston means whereby said inactive air chamber thereby constitutes an air column extension of said active air chamber;

a source of air under pressure;

second conduit means provided fluid communication between said source and said inactive air chamber means; and height control means of that type which is responsive only to relatively prolonged location of said air piston means away from said neutral position to admit air to or vent air from said inactive air chamber for locating said air piston means in said neutral position and thereby locating said axle and said suspension means in said static position, but which is unresponsive to relatively rapid movements of said air piston means away from said neutral position whereby no air is admitted to or vented from said inactive air chamber during said rapid movements.

9. Air spring apparatus according to claim 8 wherein said suspension means comprises leaf spring means in-series with said hydraulic piston means and said axle.

10. Air spring apparatus according to claim 8 wherein said control means is responsive to locations of said air piston means through mechanical coupling to said air piston means.

11. Air spring apparatus according to claim 10 wherein said control means includes a control valve and a control element movable with said air piston means to operate said control valve for admitting or venting said air.

* * * * *

UNITED STATES PATENT AND TRADEMARK OFFICE
CERTIFICATE OF CORRECTION

PATENT NO. : 4,619,467
DATED : October 28, 1986
INVENTOR(S) : James W. Lafferty

It is certified that error appears in the above-identified patent and that said Letters Patent is hereby corrected as shown below:

Column 1, line 58, delete "lead" and insert --leaf--;

Column 2, line 66, after "Consequently," insert --in--;

Column 3, line 40, delete "air so called active" and insert --so called active air--;

Column 4, line 59, delete "12" and insert --16--;

Column 5, after the last paragraph, delete "
$$k_{ss} = k_a \left[ \frac{1}{1 + \frac{k_a}{k_1}} \right]$$

and insert --
$$k_{ss} = \frac{k_a k_1}{k_a + k_1}$$
--;

Column 10, line 64, delete "active" and insert --inactive--;
Column 11, line 7, delete "provided" and insert --providing--.

This certificate supersedes certificate of correction issued January 27, 1987.

Signed and Sealed this

Twenty-first Day of April, 1987

*Attest:*

DONALD J. QUIGG

*Attesting Officer*   *Commissioner of Patents and Trademarks*